United States Patent [19]

Yerbury et al.

[11] Patent Number: 5,063,560
[45] Date of Patent: Nov. 5, 1991

[54] SPREAD-SPECTRUM MULTIPLEXED TRANSMISSION SYSTEM

[75] Inventors: Michael J. Yerbury, St. Ives; Gregory C. Hurst, Glebe, both of Australia

[73] Assignee: Advanced Systems Research Pty. Limited, Pymble, Australia

[21] Appl. No.: 265,858
[22] PCT Filed: Jan. 27, 1987
[86] PCT No.: PCT/AU87/00020
§ 371 Date: Aug. 4, 1988
§ 102(e) Date: Aug. 4, 1988
[87] PCT Pub. No.: WO87/04883
PCT Pub. Date: Aug. 13, 1987
[51] Int. Cl.$^5$ .................. H04J 13/00; H04L 27/30
[52] U.S. Cl. ........................... 370/18; 375/1
[58] Field of Search ............... 370/18, 19; 375/1

[56] References Cited

U.S. PATENT DOCUMENTS

| 4,494,228 | 1/1985 | Gutleber | 370/18 |
| 4,511,885 | 4/1985 | Gutleber | 370/18 |
| 4,601,047 | 7/1986 | Horwitz et al. | 370/18 |
| 4,697,260 | 9/1987 | Gravel et al. | 370/18 |

OTHER PUBLICATIONS

Long Range Trackings of Crocodylus Porosus, M. J. Yerby, Handbook on Biotelemetry and Radio Tracking, 1979, pp. 765-776.
The Control of Foreign Microprocessors by C. R. Drane, Proceedings of Digital Equipment Users Society, Jul. 1984.

Primary Examiner—Douglas W. Olms
Assistant Examiner—Wellington Chin
Attorney, Agent, or Firm—Armstrong, Nikaido, Marmelstein, Kubovcik, & Murray

[57] ABSTRACT

A spread-spectrum transmission system wherein a plurality of spread-spectrum signals are frequency division multiplexed by offsetting the center or carrier frequencies of the spread-spectrum signals by a fraction of the spectral-line spacing of the signals. The signals are generated by modulating a carrier with a pseudo-noise (PN) code signal. At a receiver, demultiplexing is carried out by mixing (42) the received multiplexed signal with a plurality of local oscillator frequencies (43) which are offset from each other in the same manner as the centre or carrier frequencies of the multiplexed spread-spectrum signals. The mixed signals are then further mixed (45) with generated PN code signals (47) corresponding to those used to generate the multiplexed spread-spectrum signals. The epoch of each generated PN code signal is then advanced or retarded in response to a respective epoch control signal (48) generated by a respective controller (46). After mixing (45) the signals are passed through respective narrowband filters (49) to select the baseband signals which are then fed to the respective controllers (46) to enable the generation of the epoch control signals (48). When applied to a vehicle tracking system a number of spaced receivers are utilized.

46 Claims, 5 Drawing Sheets

SPREAD-SPECTRUM MULTIPLEXED TRANSMISSION SYSTEM

BACKGROUND OF THE INVENTION

The present invention relates generally to improvements in spread-spectrum transmission systems and in a preferred embodiment the invention is applied to a vehicle location and tracking system.

A number of information bearing channels can share the same medium and approximately the same frequency band and yet be separated at the receiving end with satisfactory interchannel isolation if suitable pseudo-noise (PN) codes are used asynchronously to direct-sequence modulate the channel carriers at a high rate relative to the data rate. This has the effect of spreading the spectrum of the transmitted energy.

At the receiver, the information in each channel is extracted by cross-correlating the incoming composite stream with the code associated with the desired channel. When the clock rate and the epochs of the in-coming and locally-generated codes match, the spread-spectrum energy is collapsed to the relatively narrow, data bandwidth for that channel whilst all the other channel spectra remain spread.

This method enables a particular medium (e.g. a coaxial-cable transmission line) to carry a virtually unlimited number of channels, separation being achieved at the receiving end by code-division multiple access (CDMA). The performance of the scheme in terms of signal-to-noise ratio depends on the relative orthogonality of the codes; that is, on their cross-correlation properties. A unique feature is the smooth degradation of signal-to-noise ratio as more users come into the system compared to the sudden loss of performance which occurs in a conventional frequency division multiple access (FDMA) system once the channel capacity is exceeded.

The capability of a spread-spectrum channel to reject interference from other signals in other channels and from noise is called the process gain. Mathematically, process gain is given as:

$$G_p = 10 \log_{10} B/b \ (dB) \tag{1}$$

where

B = bandwidth of spread-spectrum signal
b = data or information bandwidth and it is assumed that the spectral line spacing of the PN codes are small enough for the spectra to be considered continuous.

Consider now the case of one transmitter, one receiver and no data. According to equation (1) the process gain is infinite because b→0. The zero-data example might be a ranging system where it is necessary only to locate the code epoch and, knowing the propagation delay, the range to the transmitter may be calculated; range ambiguity can be avoided by making the code repetition period much greater than the propagation delay. In practice the process gain can be very large, but not infinite, and is limited mainly by the extent of the loss of coherence of the carrier at the receiver relative to the receiver local oscillator. If the 'coherence time' of the received carrier is $\tau$ then $b \sim \tau^{-1}$ and process gain can be increased only by spreading the spectrum of the transmitted signal still further. This can be done by increasing the chip-rate (code clock rate) of the PN code up to a limit set by the electronics or by the ability of the transmission medium to support the spread-spectrum bandwidth.

Figure 1:
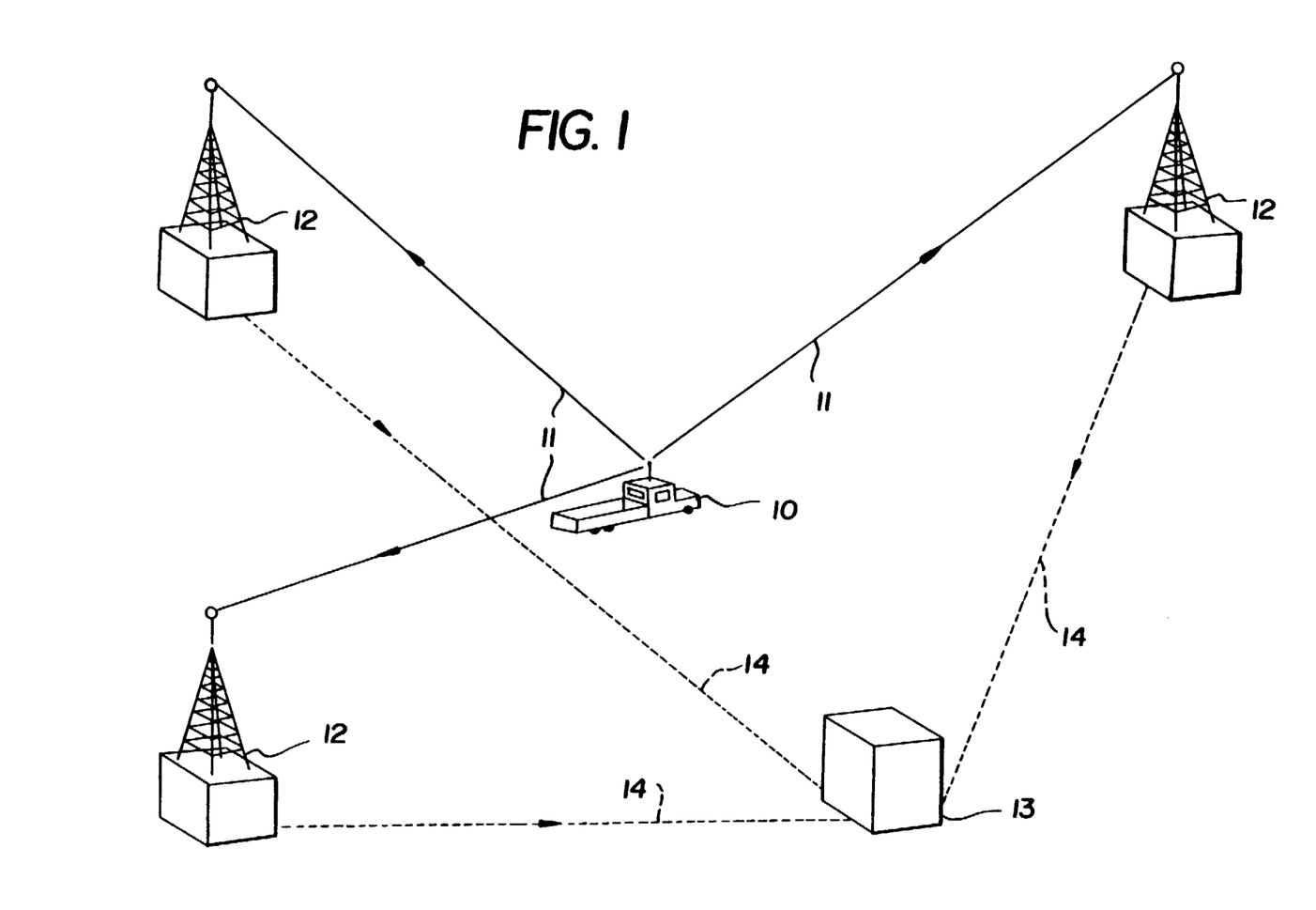
FIG. 1 generally illustrates a vehicle tracking system in which the spread-spectrum multiplexed transmission system of the present invention might be used.

Referring to FIG. 1 it may be seen that in a spread-spectrum location and tracking system, the vehicle 10 or object to be located emits a continual direct sequence spread-spectrum radio signal 11. This transmission is received at a number of well-spaced receiving stations 12 in the coverage area and the differences in the times of arrival of the signals at these receivers are measured. Inverse hyperbolic navigation techniques then may be used to compute the position of the transmitter at the central computer 13 which then sends this information to an operator terminal.

Direct sequence spread-spectrum modulation is employed for a number of reasons, one of which is to minimise multi-path effects. Also, since for location and tracking purposes there is no data transmission requirement, there would appear to be potential for very high process gain. Unfortunately the process gain is severely limited in practice. Firstly transmissions from a vehicle moving in an urban, or suburban, area experience Rayleigh scattering and Doppler frequency-shift. As a result, at each receiving site 12 the received signal spectrum is bandlimited to within $\pm \Delta f$ of the centre frequency where $\Delta f = f_0 v/c$ is the maximum Doppler frequency-shift for a vehicle with speed v transmitting on a frequency $f_o$ (c is the speed of radio propagation). The coherence time of the carrier depends roughly inversely on the width of the frequency-modulation spectrum so that this scattering sets a lower limit to b, the post-correlation bandwidth. Secondly, the radio-frequency spread-spectrum bandwidth cannot be made arbitrarily wide because of limitations on the coherence bandwidth caused by different fading in different parts of the spectrum.

A rough estimate of the available process gain using urban mobile transmitters may be obtained from published data. For a centre frequency of about 450 MHz the minimum coherence time is about 5 ms and the coherence bandwidth is around 1 MHz giving an available process gain of approximately 37 dB. This figure gives a measure of the level of signal enhancement, over broadband spectrally-continuous noise and interference, achievable by receiver processing.

For a spread-spectrum multi-vehicle location and tracking system in which M transmitters are operating simultaneously, each transmitter to be located and tracked has (M−1) interferers. If CDMA is used, the cross-correlation properties of the codes of the wanted and unwanted signals will determine the extent of the interference. In the commonly-used binary Gold code family, the cross-correlation between any pair of codes generated using n-bit shift registers is bounded by $$|\Theta(r)| \leq 2^{(n+1)/2} + 1 \quad \text{(n odd)}$$

$$|\Theta(r)| \leq 2^{(n+2)/2} - 1 \quad \text{(n even)}$$

Since these sequences are of maximal length, the number of bits in the code is:

$$N = 2^n - 1$$

and for $n \gg 1$ the ratio of the auto-correlation peak to the maximum cross-correlation bound is $$R \sim 2^{(n-1)/2} \quad \text{(n odd)}$$

$\sim 2^{(n-2)/2}$ (n even)

The larger n is made, the better the wanted signal can be distinguished from the unwanted ones. In other words, the longer the sequence length (N) the better. However, $$N = T_R f_c \quad (2)$$

where
 $T_R$ = code repetition period
 $f_c$ = chip rate
and, as we have seen already, for an urban vehicle-tracking system, both $T_R$ and $f_c$ have practical upper limits set by the coherence time and coherence bandwidth respectively so there is a practical upper limit set on the choice of N. For the particular example quoted above we have N~5000 With this value of N we have n~12 and hence R~32 giving a maximum 'process gain' of about 15 dB. Clearly in this case CDMA falls well short when its performance is compared to the available process gain (over an interference continuum) of 37 dB.

It is important to understand that the spectral components of a spread-spectrum signal are spaced by $f_R = 1/T_R = f_c/N$. For a given chip rate, long PN codes have spectral lines very close together and short PN codes have widely-separated lines. A long code may be modelled to have a continuous power spectrum but with a short code the discrete lines must be considered, particularly as they affect the process gain which varies in discrete steps according to the number of spectral lines falling into the passband of the post-correlation filter.

The usefulness of a vehicle-tracking or locating system is enhanced in proportion to the number of vehicles which can be located or tracked at the same time. A high, realisable, process gain is needed in such a spread-spectrum multi-vehicle tracking system because of the necessity of isolating each received transmission from the others; a requirement which is exacerbated by the 'near-far problem'.

This invention exploits the quasi-discrete nature of the mobile transmitters' spectra and employs a novel form of frequency division multiple access (FDMA) to effect this isolation.

SUMMARY OF THE INVENTION

The present invention consists in a spread-spectrum transmission system wherein a plurality of spread-spectrum signals are frequency division multiplexed in a novel way, and each signal having an information bandwidth which is significantly less than its spectral line or band spacing each signal being produced by modulating a carrier with a pseudo-noise code and where the spread spectrum signals each have centre or carrier frequencies which are spaced by an increment selected to cause the spectral lines or bands of the respective transmitted signals to be interleaved, the selected increment being less than the transmitted bandwidth of each signal.

In preferred embodiments of the invention the transmission bandwidth for an M-channel system is increased only slightly over that of a single channel while achieving substantially greater channel isolation than is possible using CDMA techniques.

The invention is applicable to all spread-spectrum transmission systems where the information bandwidth is much less than the spectral line or band spacing of the transmitted spectrum. The utility of spread-spectrum systems in which the information bandwidth is essentially zero, such as systems using spread-spectrum signals for ranging purposes, is particularly enhanced.

According to other aspects of the invention, a receiver for a spread-spectrum multiplexed transmission system and a spread-spectrum vehicle tracking system are also provided.

BRIEF DESCRIPTION OF THE DRAWINGS

An embodiment of the invention will now be described, by way of example, with reference to the accompanying drawings in which.

DESCRIPTION OF THE PREFERRED EMBODIMENTS

The present invention exploits the quasi-discrete nature of the transmitters' spectra and employs a novel form of frequency division multiple access (FDMA). To understand the principles involved we refer to FIG. 2 which shows details of the spectrum emitted by a transmitter using a maximal PN code of length N to direct-sequence bi-phase modulate a carrier on a frequency $f_o$.

Figure 2:
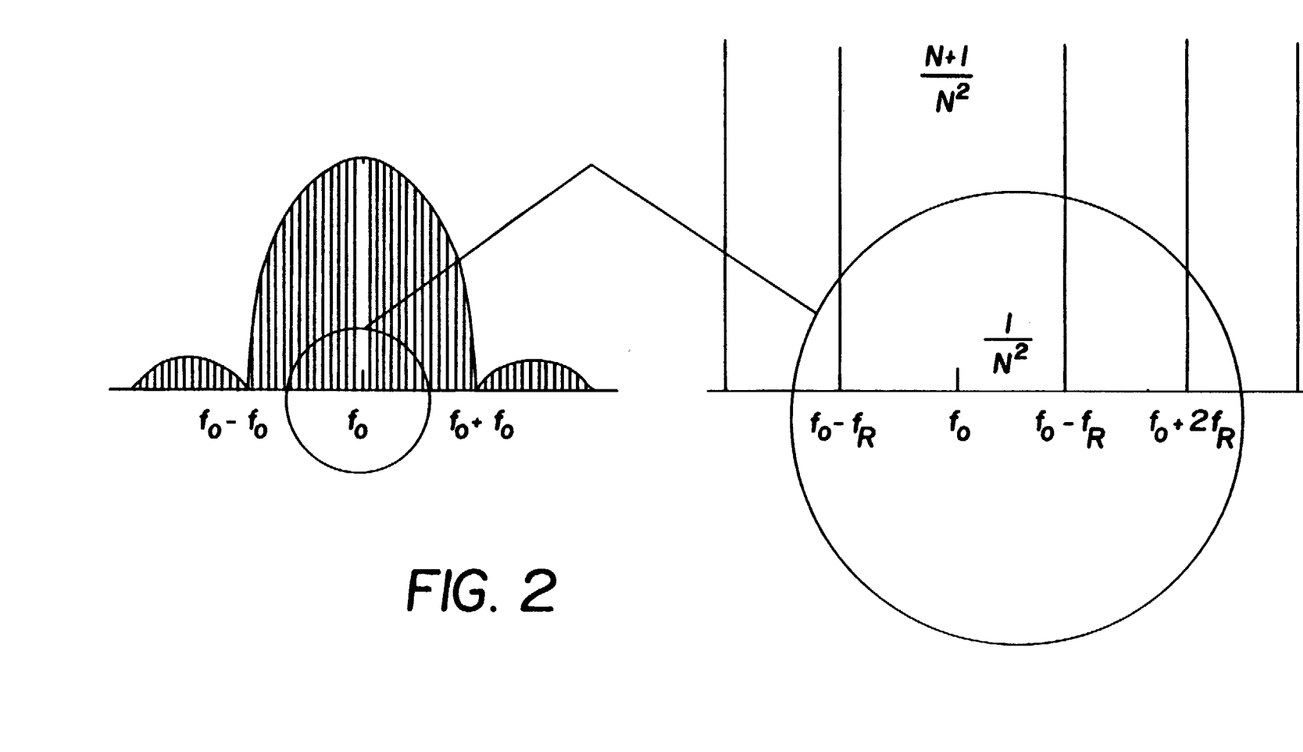
FIG. 2 graphically illustrates the frequency domain representation of a spread-spectrum signal.

The diagram shows that the spectral lines are spaced by the code repetition frequency $f_R = f_c/N$ and that the spectrum of the transmitted signal is symmetrical about the carrier frequency $f_o$. When this signal is emitted from a mobile vehicle in an urban area it undergoes Rayleigh scattering and Doppler frequency-shift as the radio waves propagate by a multitude of paths to the receiver. Each line in the spectrum of the received signal exhibits random frequency modulation (as described above) with most of the energy of the line being contained within a bandwidth of twice the maximum Doppler frequency-shift. Specifically, if the speed of the vehicle is v and the speed of radio propagation is c, the energy of a spectral line is contained essentially in a bandwidth $2\Delta f$ where $\Delta f = f_o v/c$. As an example, if $f_o$ is 450 MHz and v = 100 km/hr we have $2\Delta f \sim 85$ Hz. In order to enhance the signal-to-noise ratio of this signal by processing in the receiver, the final local oscillator can be direct-sequence modulated with the same PN code as used in the transmitter, the local epoch of the code being adjusted until it matches that of the incoming code. When this happens, the energy contained in all the spectral lines of the received signal is concentrated essentially into the bandwidth $2\Delta f$ centered on the final intermediate frequency In other words, the spectrum is collapsed or 'despread' and the process gain is achieved. From the foregoing it is clear that the bandwidth of the final IF must be wide enough to accommodate the collapsed spectral energy. Allowing for an uncertainty $\pm \delta f$ in the carrier frequency of the transmitter, the final IF bandwidth should not be less than $2(\Delta f + \delta f)$.

The radiated spread-spectrum signal from each transmitter occupies a relatively wide bandwidth B (typically of the order of 1 MHz). When M transmitters are operating simultaneously, as in a multi-vehicle tracking system, the use of FDMA would suggest a bandwidth requirement of at least M×B for the system as a whole. In urban areas particularly, the radio-frequency spectrum is viewed as a scarce resource much in demand. Consequently, the use of a bandwidth M×B is likely to be considered extravagent. The present invention offers an acceptable answer to these objections without the degradation in process gain associated with CDMA.

The present invention uses the fact that although the bandwidth of the signal received from each transmitter is very wide, it has a quasi-discrete line spectrum arranged symmetrically about the carrier. If the spacing between the 'lines' is made large compared to the frequency band each one occupies and if the same spacing is used for all transmitters, it is possible to interleave these 'lines' (or bands) by offsetting the centre frequencies of all the transmitters by relatively small amounts in the following way:

Let the number of simultaneous transmissions be M. If all the transmitters have centre-frequency offsets which are multiples of $f_R P/M$ where P is a non-zero integer such that P and M have no common factors then the $i^{th}$ channel has a centre frequency offset $$f_i = (i-1)f_R P/M \qquad (3)$$

where $i = 1, 2, \ldots, M$

Now providing the width of the individual 'lines' is less than $f_R/M$ the individual channels have been interleaved in such a way as to produce no interchannel interference. The extent to which the bandwidth is increased over that of a single channel is $f_R P(M-1)/M$ compared to an increase of at least $(M-1) \times B$ for a conventional FDMA approach. This represents a very substantial saving. In the limit, where P = 1, the bandwidth extension is insignificant since $B >> f_R$.

Consider now the process gain. If the effective bandwidth of the final IF filter is b, then in the presence of a continuous spectrum of broadband noise and interference, a process gain of B/b is realisable. However, the received spectrum from M simultaneously-operating transmitters with carrier frequency offsets as in eqn (3) above consists of quasi-discrete spectral lines separated by $$f_s = f_c/MN = f_R M \qquad (4)$$

If we increase the number of simultaneously operating transmitters, M, whilst keeping the IF bandwidth b fixed, the spectral 'line' spacing decreases according to eqn (4). As this happens, the number of spectral 'lines' entering the IF bandwidth increases. If we define the process gain, in the context of multiple transmitters, as the ratio of the power from the wanted transmitter to that from the unwanted ones, it is clear that the process gain will fall as M increases due to the power contributed by the unwanted transmissions to the signal within the filter bandwidth b.

Other kinds of radio interference must be considered also. For example, a continuous radio-frequency wave (CW) in the receiver passband will be spread into discrete lines when it is mixed with the phase-encoded local oscillator. The spacing between these lines will be $f_R = f_c/N$ where $f_c$ is the chip rate of the local code and N is the length of the code. Just as for a transmitter, the spectrum will be symmetrical about the frequency difference between the continuous wave and the local oscillator. Since the frequency of the interfering signal is determined by factors external and unrelated to the spread-spectrum transmission system it is possible for a single spectral line to fall into the passband b of the final IF stage (assuming $b < f_R$) with a probability proportional to N and with a power level roughly inversely proportional to N. This means, for example, that the smaller N is made for a given chip rate $f_c$ the less likely it is for an interfering spectral line to fall into the final IF bandwidth b. When this does happen however, the effect of the interference is greater although a single interfering CW will affect only one of the M channels in the receiver.

It may seem from the foregoing that, given $f_c$, a multi-vehicle locating system is implemented more effectively by using a shorter code. (A lower limit to the code length is set by the need to avoid range ambiguity; that is, $f_R^{-1} = N/f_c$ must be much greater than the signal propagation delay.) In fact, however, it is preferable to use a longer code in order to approximate more closely a spectral continuum in the radiation emitted by each transmitter whilst still being able to exploit the quasi-discrete nature of its spectrum. This is so because in an urban environment, it is desirable to diffuse the transmitted energy as nearly as possible into a continuum in order to minimise interference to conventional radio receivers.

In the preferred embodiment of the invention all transmitters use the same maximal PN code to direct-sequence, bi-phase modulate their respective carriers which are separated in the frequency domain in accordance with equation (3). Maximal PN sequences are preferred because of their well-controlled autocorrelation properties. The choice of the code length N is determined by the factors discussed above and, along with other parameters, is given by way of example in Table 1 for a ten-vehicle location system.

TABLE 1

| Parameters of the preferred embodiment given by way of example but not limitation. | | |
|---|---|---|
| Number of Channels | (M) | 10 |
| Nominal centre frequency of mobile transmitter band | $(f_o)$ | 440 MHz |
| Code length | (N) | 511 bits |
| Modulation type | | Bi-phase (0 or $\pi$), direct sequence |
| Code clock rate | $(f_c)$ | 1.024 MHz |
| Frequency increments of mobile transmitters | $(f_R P/M)$ | 14.2 KHz |
| Nominal power radiated in the main spread-spectrum lobe | | 20 mW |

Figure 3:
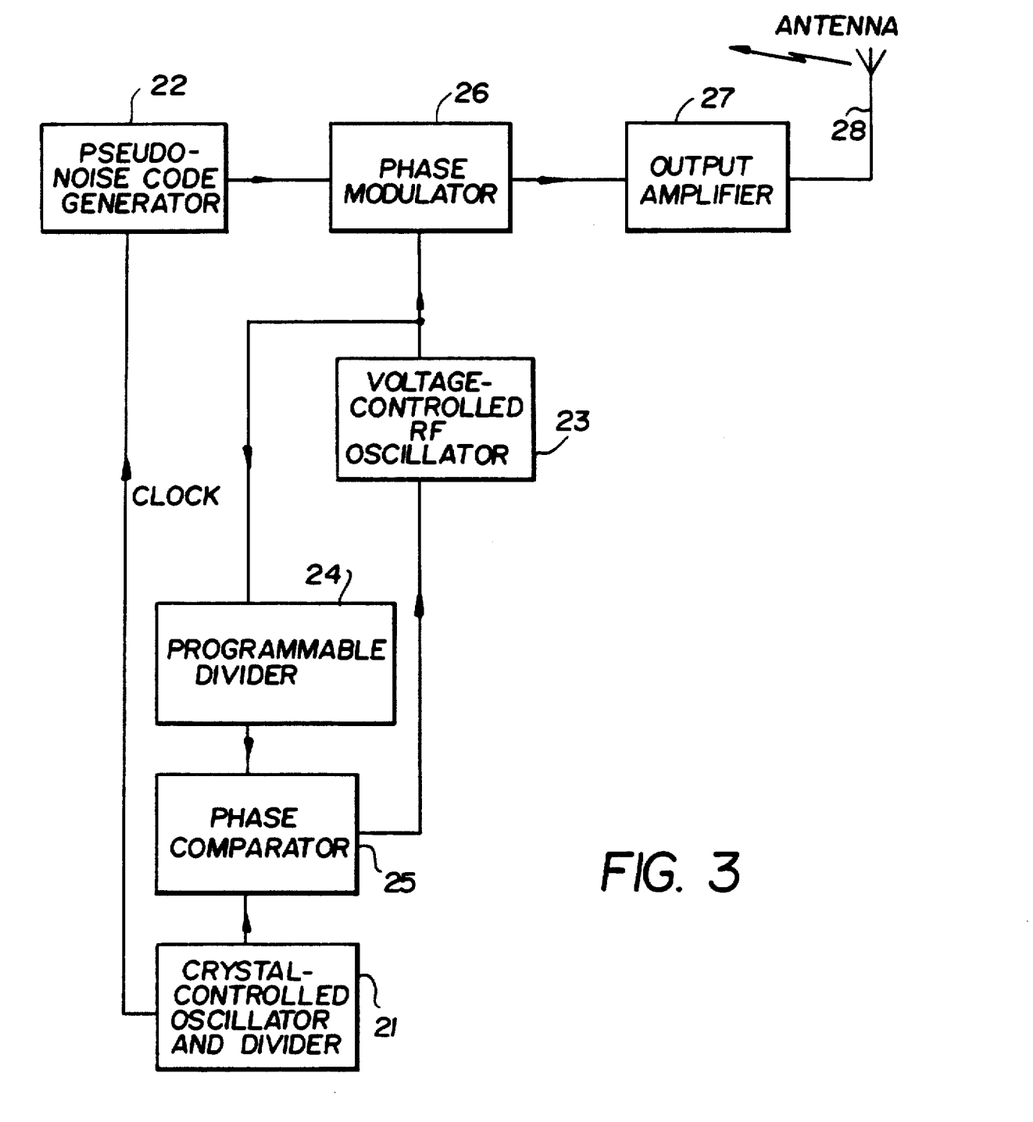
FIG. 3 is a block diagram of a spread-spectrum transmitter for use in a vehicle tracking system using the present invention.

The transmitter which is attached to the vehicle is shown schematically in FIG. 3. A crystal-controlled oscillator and divider 21 provide a clock for the pseudo-noise code generator 22 and a reference to which the voltage-controlled radio-frequency oscillator 23 is locked via a programmable divider 24 and phase comparator 25. The output from the pseudo-noise generator is applied to the modulator 26 which bi-phase modulates (0 or $\pi$) the RF carrier. This modulated wave is amplified in the output amplifier 27 and radiated from the antenna 28.

The vehicle-borne transmitter may transmit continuously, or it may be considered preferable to switch the transmitter on and off locally or by remote control.

Figure 4:
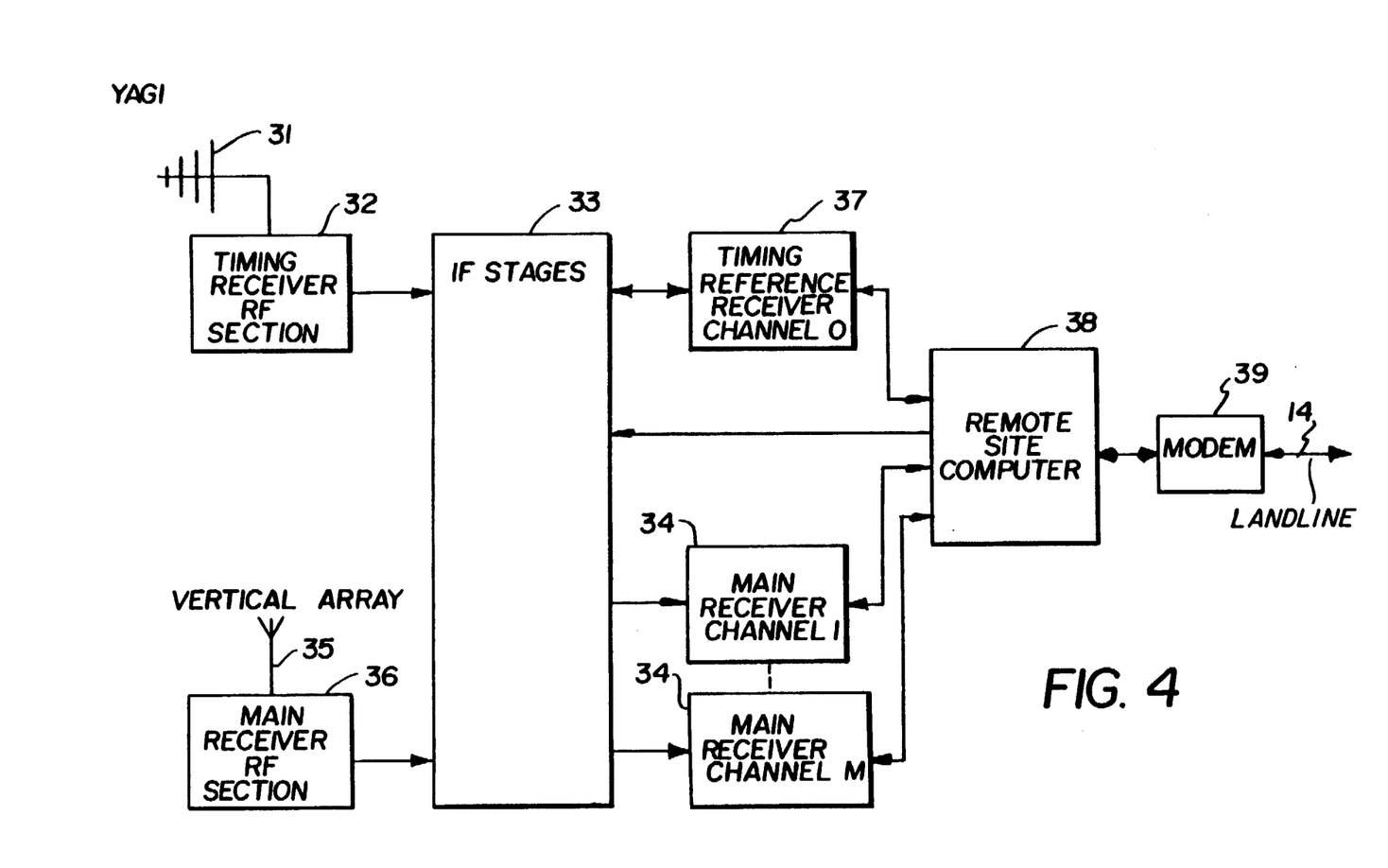
FIG. 4 is a block diagram of a remote site receiver installation for use in a vehicle tracking system using the present invention.

A block diagram of the remote receiving station electronics of an M-channel system is shown in FIG. 4. In the preferred embodiment the timing at all remote sites is synchronised to a received timing signal radiated from a fixed location. This timing transmission is received preferably by means of a high-gain antenna 31 such as a Yagi connected to the radio frequency (RF) section 32 of the timing receiver. The intermediate frequency (IF) stages of both the timing reference and main receivers are housed in the same unit 33 where the local clock is synchronised by control signals from the channel 0 timing reference receiver 37, which also supplies a reference epoch signal 50 (see FIG. 5) for distribution through this common unit to the M main receiver channels 34.

Figure 5:
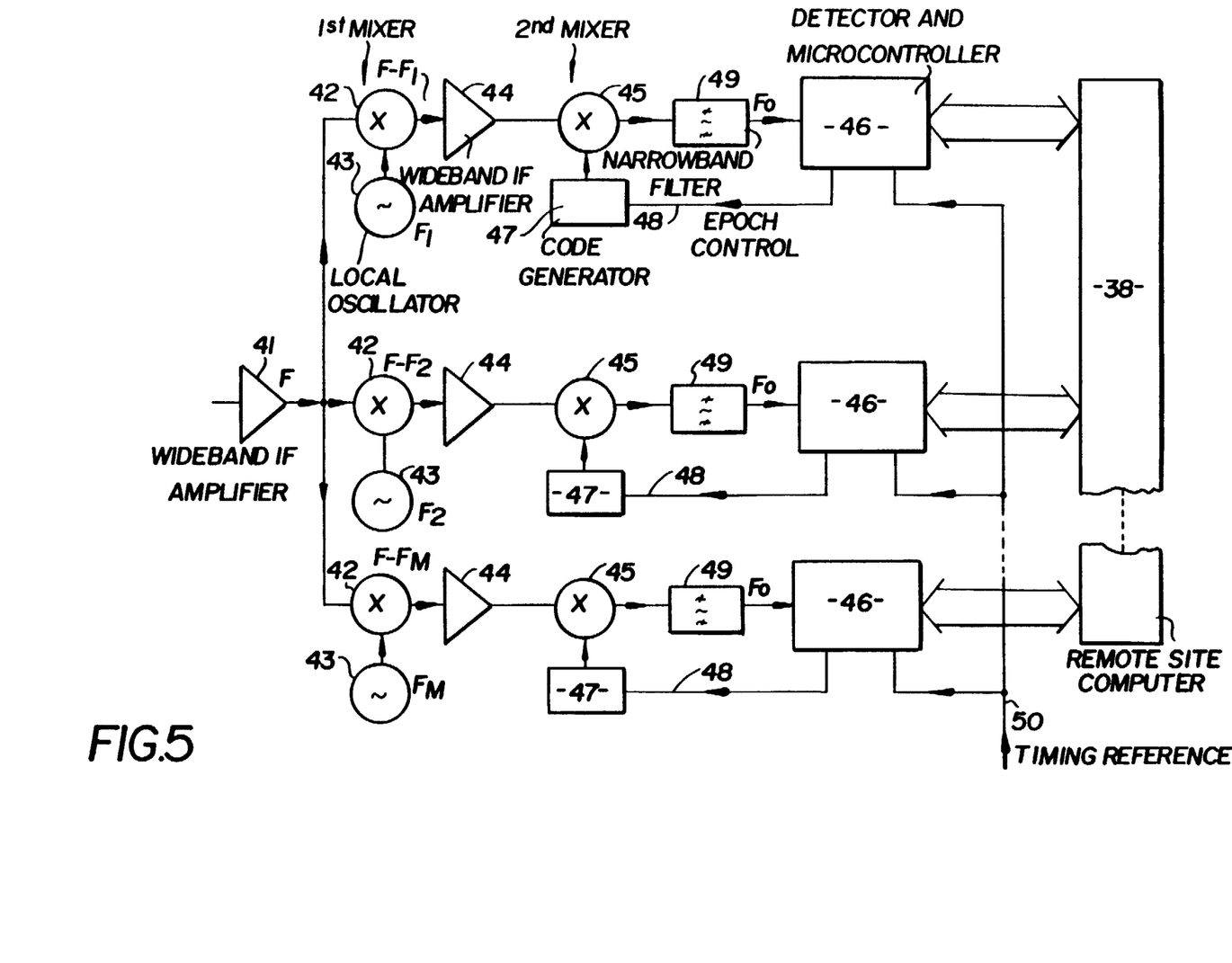
FIG. 5 is a block diagram of the installation of FIG. 4 showing the receiver arrangement in greater detail.

Spread-spectrum signals from the vehicle transmitters are received by means of the vertical antenna-array 35 and main receiver RF section 36, and are converted to intermediate frequencies retaining their offsets in accordance with equation (3) above. This is effected in the IF stages. FIG. 5 shows in more detail how the M individual transmissions are acquired and their epochs are tracked. With reference to this diagram we note that all received spread-spectrum signals are amplified in the first wideband amplifier 41 at an intermediate frequency F. This amplifier has a bandwidth wide enough to pass all the spread-spectrum signals from the mobile transmitters. These amplified signals are split equally and passed to M identical first mixers 42 each of which is fed by a different local oscillator 43. The frequencies of the local oscillators $F_1, F_2, \ldots F_M$ are offset from each other in accordance with equation (3) just as for the transmitter carrier frequencies. Consequently receiver channel i with local oscillator frequency $F_i$ locates the centre frequency of the signal received from transmitter i at $F_o$ where $i=1,2, \ldots M$. The outputs of the first mixers are amplified in second wideband amplifiers 44 and applied to second mixers 45 where the PN code generated in code generators 47 operates on the local oscillator ports. Although the same PN code is used, the epochs in each channel are independently varied in response to epoch control signals 48 produced by microcontrollers contained in the detector and microcontroller blocks 46. Each epoch is adjusted until it matches that of the incoming signal for that channel. When this occurs, the spectrum of this signal collapses to the relatively narrowband of frequencies (determined by the Doppler frequency-shift and transmitter crystal-oscillator uncertainty as discussed in section 2 above) all centred on $F_o$. This narrowband signal appears at the output of the second mixer 45 and passes through the narrowband filter 49 to the detector and microcontroller block 46 which detects the signal and maintains a match between the incoming and locally-generated code epoch by appropriate advance/retard adjustment of the locally-generated code. There are many ways of achieving code epoch tracking which will be familiar to those skilled in the art and need not be described here. Finally, the time difference between the epoch of the code in a tracking channel and the timing reference 50 is measured in the detector and microcontroller block 46 and the time measured for each channel is passed to the remote site computer 38 and finally via the modem 39 and land line 14 of FIG. 4 to the central computer 13 shown in FIG. 1.

We claim:

1. A multi-channel spread-spectrum transmission system, wherein a plurality of spread-spectrum signals are frequency division multiplexed to provide multiple transmission channels, comprising:

a plurality of transmitters each for transmitting a signal having a plurality of spaced spectral lines or bands produced by modulating a carrier with a pseudo-noise code, such that the transmitted signal of each channel has an information bandwidth which is significantly less than its spectral line or band spacing and the spread-spectrum signals each have centre frequencies which are spaced, respectively, by frequency increments selected to cause the spectral lines or bands of the respective transmitted signals to be interleaved, the selected frequency increments being less than the transmitter bandwidth of each signal.

2. The system as claimed in claim 1, wherein the transmitted signal of each channel has an information bandwidth of essentially zero.

3. The system as claimed in claim 1, wherein the spectral lines or bands of each of the spaced-spectrum signals are spaced by a frequency $f_R$ and the centre frequencies of the respective signals are spaced by frequency increments of $f_R P/M$ where P is a non-zero integer and M is a number of channels greater than 1 such that P and M have no common factors.

4. The system as claimed in claim 1, wherein the selected increments by which the centre frequencies of the respective signals are spaced are such that the bandwidth occupied by all transmitted signals of the system as a whole is not substantially greater than the bandwidth of the individual spread-spectrum signals.

5. The system as claimed in claim 3, wherein P is chosen such that the bandwidth occupied by the system as a whole is not substantially greater than the bandwidth of the individual spread-spectrum signals.

6. The system as claimed in claim 3, wherein P is selected to be less than M.

7. The system as claimed in claim 3, wherein P is selected to be 1 and the centre frequencies of the respective signals are spaced by the frequency $f_R/M$.

8. The system as claimed in claim 3, wherein P is selected to be $M+1$.

9. The system as claimed in claim 1, wherein each carrier consist of a band of frequencies due to the statistical uncertainty of its frequency and the spacing between spectral lines or bands of a composite signal of all transmitted signals is approximately equal to the sum of the channel information bandwidth and the statistical uncertainty bandwidth of the carriers, a code length of the pseudo-noise code and a clock rate of the code being chosen such that $f_R = Mf_L$ where M is the number of system channels, $f_R$ is the spectral-line frequency spacing of individual spread-spectrum signals and $f_L$ is the frequency spacing between spectral lines or bands of the composite signal.

10. A receiver for receiving a plurality of transmitted spread-spectrum signals which are frequency division multiplexed to provide a plurality of transmission channels, wherein the channels are distinguished by respective signal centre frequencies, each signal comprising a plurality of spaced spectral lines or bands produced by modulating a carrier with a pseudo-noise code, the carrier consisting of a band of frequencies due to the statistical uncertainty of its frequency, the transmitted signal of each channel having an information bandwidth which is significantly less than its spectral line or band spacing, and where the centre frequencies of the spread-spectrum signals are spaced by frequency increments selected to cause spectral lines or bands of the respective transmitted signals to be interleaved, the selected frequency increments being less than the transmitted bandwidth of each signal, said receiver comprising:

receiver means including a plurality of receiver channels, correlation means being provided for each receiver channel to cause the spread-spectrum signal received on a respective channel to be collapsed to a narrow bandwidth corresponding to the transmission channel signal bandwidth which comprises the sum of the carrier frequency uncertainty bandwidth and the channel information bandwidth such that it is selected by being passed through a narrowband filter having a bandwidth corresponding to said transmission channel signal bandwidth, eliminating essentially all interference from other channels as well as wideband noise lying outside the filter bandwidth.

11. The receiver as claimed in claim 10, wherein each channel signal has an information bandwidth of essentially zero.

12. The receiver as claimed in claim 10, wherein the spectral lines or bands of each of the spread-spectrum signals are spaced by a frequency $f_R$ and the centre frequencies of the respective signals are spaced by frequency increments of $f_R P/M$ where P is a non-zero integer and M is a number of channels greater than 1 such that P and M have no common factors.

13. The receiver as claimed in claim 10, wherein the selected increments by which the centre frequencies of the respective signals are spaced are such that the bandwidth occupied by all received signals of the system as a whole is not substantially greater than the bandwidth of the individual spread-spectrum signals.

14. The receiver as claimed in claim 12, wherein P is chosen such that the bandwidth occupied by all received signals of the system as a whole is not substantially greater than the bandwidth of the individual spread-spectrum signals.

15. The receiver as claimed in claim 12, wherein P is selected to be less than M.

16. The receiver as claimed in claim 12, wherein P is selected to be 1 and the channel centre frequencies are spaced by the frequency $f_R/M$.

17. The receiver as claimed in claim 12, wherein P is selected to be $M+1$.

18. The receiver as claimed in claim 10, wherein the spacing between spectral lines or bands of a composite signal of all received signals is approximately equal to the sum of the channel information bandwidth and an uncertainty bandwidth of the carriers, a code length of the pseudo-noise code and a clock rate of the code being chosen such that $f_R = M f_L$ where $f_L$ is the frequency spacing between spectral lines or bands of the composite signal, $f_R$ is the spectral-line frequency spacing of the individual spread-spectrum signals and M is the number of channels.

19. A multi-vehicle vehicle location and tracking system capable of tracking a plurality of vehicles at the same time, comprising:

a) a plurality of mobile radio-frequency transmitters each mounted on a vehicle to transmit a spread-spectrum signal comprising a plurality of spaced spectral lines or bands and having an information bandwidth which is significantly less than its spectral line or band spacing, the spread-spectrum signal being produced by modulating a carrier with a pseudo-noise code and the spread-spectrum signals from respective individual transmitters having centre frequencies which are spaced from each other by frequency increments selected to cause spectral lines or bands of the respective transmitted signals to be interleaved, the selected frequency increments being less than the transmitted bandwidth of each signal;

b) at least three multi-channel receivers positioned at known spaced locations each being arranged to receive the spread-spectrum signals transmitted by each of the transmitters, correlation means being included in each channel receiver to cause the spread-spectrum signal received from an individual transmitter associated with the respective channel to be collapsed to a narrow bandwidth corresponding to the transmitted channel signal bandwidth which comprises the sum of the carrier frequency uncertainty bandwidth and the channel information bandwidth such that it is selected by being passed through a narrowband filter, thereby eliminating essentially all interference from the transmitted signals of other channels as well as wideband noise lying outside the filter bandwidth; and control means communicating with each of the from a receivers and including signal processing means to measure differences in the propagation time from a respective transmitter to each receiver for each one of said transmitted signals and to thereby calculate the position of the respective transmitter relative to the receivers.

20. The vehicle tracking system as claimed in claim 19, wherein the spectral lines or bands of each of the transmitted spread-spectrum signals are spaced by a frequency $f_R$ and the centre frequencies of the respective signals are spaced by frequency increments of $f_R P/M$ where P is a non-zero integer and M is a number greater than 1 of vehicles to be tracked at the same time such that P and M have no common factors.

21. The vehicle tracking system as claimed in claim 19, wherein the selected frequency increments, by which the centre frequencies of the respective signals spaced, are such that the bandwidth occupied by all transmitted signals of the system as a whole is not substantially greater than the bandwidth of the individual transmitted spread-spectrum signals.

22. The vehicle tracking system as claimed in claim 20, wherein P is chosen such that the bandwidth occupied by all transmitted signals of the system as a whole is not substantially greater than the bandwidth of the individual transmitted spread-spectrum signals.

23. The vehicle tracking system as claimed in claim 20, wherein P is selected to be less than M.

24. The vehicle tracking system as claimed in claim 20, wherein P is selected to be 1 and the centre frequencies of the individual transmitted spread-spectrum signals are spaced by the frequency $f_R/M$.

25. The vehicle tracking system as claimed in claim 20, wherein P is selected to be $M+1$.

26. The vehicle tracking system as claimed in claim 19, wherein each of the received carrier frequencies has a statistical uncertainty which is the sum of a statistical uncertainty of the transmitted carrier frequency and a motion and/or medium induced uncertainty in the received frequency from the mobile transmitters, and the spacing between spectral lines or bands of a composite signal of all transmitted signals is approximately equal to the carrier frequency uncertainty bandwidth due to the statistical uncertainties of the received frequencies, the pseudo-noise code having a code length and a clock-rate which are chosen such that $f_R = Mf_L$ where M is the number of simultaneously tracked vehicles, $f_R$ is the spectral line frequency spacing of the individual spread-spectrum signals and $f_L$ is the frequency spacing between spectral lines or bands of the composite signal.

27. The method of providing multi-channel communication within a spectrum comprising:

transmitting a plurality of spread-spectrum signals frequency multiplexed within said spectrum, each signal comprising a plurality of frequency-spaced spectral lines or bands produced by modulating an information-bearing carrier with a pseudo-noise code such that each channel has an information bandwidth significantly less than the frequency spacing of its spectral lines or bands, wherein each spread-spectrum signal carrier frequency is selected to be spaced from adjacent carrier frequencies by a frequency increment such as to cause the spectral lines or bands of respective transmitted signals to be interleaved, said frequency increment being less than the transmitted bandwidth of each signal; and processing each received signal of said transmitted signal by correlating a composite signal of all the received spread-spectrum signals with a locally-generated pseudo-noise code to cause the spread-spectrum signal on a respective channel to be collapsed to a narrow bandwidth substantially corresponding to the transmitted signal information bandwidth, and passing said collapsed signal through a narrowband filter corresponding to the respective channel centre frequency so as to pass only transmitted signal information and eliminate interference from other received spread-spectrum signals as well as widened noise lying outside the filter bandwidth.

28. The vehicle tracking system of claim 19 wherein the transmitted spread-spectrum signals have an information bandwidth of essentially zero.

29. A method of transmitting in a multi-channel communications system, a plurality of spread-spectrum signals being frequency division multiplexed within said spectrum, comprising:

for each signal, modulating an information-bearing carrier with a pseudo-noise code to provide a plurality of frequency-spaced spectral lines or bands, such that each channel has an information bandwidth significantly less than the frequency spacing of its spectral lines or bands; and selecting each spread-spectrum signal carrier frequency to be spaced from adjacent carrier frequencies by a frequency increment such as to cause the spectral lines or bands of respective transmitted signals to be interleaved, said frequency increment being less than the transmitted bandwidth of each signal.

30. The method of claim 29, further including modulating each channel such that it has an information bandwidth of essentially zero.

31. The method as claimed in claim 29 further including selecting the spectral lines or bands of each of the spread-spectrum signals to be spaced by frequencies $f_R$ and the centre frequencies of the respective signals to be spaced by frequency increments of $f_R P/M$ where P is a non-zero integer and M is a number of channels greater than 1 such that P and M have no common factors.

32. The method as claimed in claim 29 further including spacing the selected increments of the centre frequencies of the respective signals such that the bandwidth occupied by all transmitted signals of the system as a whole is not substantially greater than the bandwidth of the individual spread-spectrum signals.

33. The method as claimed in claim 31 further including choosing P such that the bandwidth occupied by all transmitted signals of the system as a whole is not substantially greater than the bandwidth of the individual spread-spectrum signals.

34. The method as claimed in claim 31 further including choosing P to be less than M.

35. The method as claimed in claim 31 further including choosing P to be 1 and selecting the centre frequencies of the respective signals to be spaced by the frequency $f_R/M$.

36. The method as claimed in claim 31 further including selecting P to be M+1.

37. The method as claimed in claim 29, further including modulating each carrier such that it consists of a band of frequencies due to the statistical uncertainty of its frequency, and the spacing between spectral lines or bands of a composite signal of all transmitted signals is approximately equal to the sum of the channel information bandwidth and the statistical uncertainty bandwidth of the carriers, and selecting a code length of the pseudo-noise code and a clock-rate of the code such that $f_R = Mf_L$ where M is the number of system channels, $f_R$ is the spectral-line frequency spacing of individual spread-spectrum signals and $f_L$ is the frequency spacing between spectral lines or bands of the composite signal.

38. The method of processing, in a multi-channel communication system, each of a plurality of spread-spectrum signals being multiplexed within said spectrum, wherein the channels are distinguished by respective signal centre frequencies, each signal comprising a plurality of spaced spectral lines or bands, and the respective signal centre frequencies being such that the spectral lines or bands of the individual channel signals are interleaved to form a composite signal, comprising:

correlating a composite signal of all the received spread-spectrum signals with a locally generated pseudo-noise code to cause the spread-spectrum signal on a respective channel to be collapsed to a narrow bandwidth substantially corresponding to the transmitted signal information bandwidth; and passing said collapsed signal through a narrowband filter corresponding to the respective channel centre frequency so as to pass only transmitted signal information and eliminate interference from other received spread-spectrum signals as well as wideband noise lying outside the filter bandwidth.

39. The method as claimed in claim 38 further selecting the narrowband filter of each channel to have an information bandwidth of essentially zero.

40. The method as claimed in claim 38 further including selecting the spectral lines or bands of each of the spread-spectrum signals to be spaced by a frequency $f_R$ and the centre frequencies of the respective signals to be spaced by frequency increments of $f_R P/M$ where P is a non-zero integer and M is a number of channels greater than 1 such that P and M have no common factors.

41. The method as claimed in claim 38 further including selecting the increments by which the centre frequencies of the respective signals are spaced to be such that the bandwidth occupied by all received signals of the system as a whole is not substantially greater than the bandwidth of the individual spread-spectrum signals.

42. The method as claimed in claim 40 further including choosing P such that the bandwidth occupied by all received signals of the system as a whole is not substantially greater than the bandwidth of the individual spread-spectrum signals.

43. The method as claimed in claim 40 further including selecting P to be less than M.

44. The method as claimed in claim 40 further including selecting P to be 1 and the channel centre frequencies to be spaced by the frequency $f_R/M$.

45. The method as claimed in claim 40 further including selecting P to be M+1.

46. The method as claimed in claim 38, wherein the spacing between spectral lines or bands of a composite signal of all received signals is approximately equal to the sum of the channel information bandwidth and an uncertainty bandwidth of the carriers, a code length of the pseudo-noise code and a clock-rate of the code being chosen such that $f_R = Mf_L$ where $f_L$ is the frequency spacing between spectral lines or bands of the composite signal, $f_R$ is the spectral-line frequency spacing of individual spread-spectrum signals and M is the number of channels.

* * * * *

UNITED STATES PATENT AND TRADEMARK OFFICE
CERTIFICATE OF CORRECTION

PATENT NO. : 5,063,560
DATED : November 5, 1991
INVENTOR(S) : Michael J. YERBURY et al It is certified that error appears in the above-identified patent and that said Letters Patent is hereby corrected as shown below:

In Claim 5, column 8, line 33, after "by" insert -- all transmitted signals of --.

Signed and Sealed this

Eighth Day of February, 1994

Attest:

BRUCE LEHMAN

Attesting Officer

Commissioner of Patents and Trademarks